United States Patent
Ichihashi et al.

(10) Patent No.: US 6,909,478 B2
(45) Date of Patent: Jun. 21, 2005

(54) METHOD FOR PRODUCING CHOLESTERIC LIQUID CRYSTAL COLOR FILTERS

(75) Inventors: Mitsuyoshi Ichihashi, Shizuoka-ken (JP); Yuichi Wakata, Shizuoka-ken (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 8 days.

(21) Appl. No.: 10/046,147

(22) Filed: Jan. 16, 2002

(65) Prior Publication Data

US 2002/0130993 A1 Sep. 19, 2002

(30) Foreign Application Priority Data

Jan. 18, 2001 (JP) ....................................... 2001-010534

(51) Int. Cl.⁷ ............................................ G02F 1/1335
(52) U.S. Cl. ........................................ 349/106; 349/93
(58) Field of Search ........................... 349/86, 106, 93, 349/188, 182, 183, 187, 88

(56) References Cited

U.S. PATENT DOCUMENTS

| | | | | |
|---|---|---|---|---|
| 5,771,084 A | * | 6/1998 | Fujimori et al. | ............ 349/153 |
| 6,344,300 B1 | * | 2/2002 | Baba et al. | ................... 430/7 |
| 6,549,261 B1 | * | 4/2003 | Okada et al. | ............... 349/176 |
| 2002/0085147 A1 | * | 7/2002 | Ko | |

FOREIGN PATENT DOCUMENTS

| | | |
|---|---|---|
| JP | 59-83112 | 5/1984 |
| JP | 59-83113 | 5/1984 |
| JP | 2001-4822 | 1/2001 |
| JP | 2001-4824 | 1/2001 |
| JP | 2001-83694 | 3/2001 |
| JP | 2001-159706 | 6/2001 |
| JP | 2001-159708 | 6/2001 |
| JP | 2001-159709 | 6/2001 |
| JP | 2001-242315 | 9/2001 |
| JP | 2001-303057 | 10/2001 |
| JP | 2001-305329 | 10/2001 |
| WO | WO 00/34808 | 6/2000 |

\* cited by examiner

*Primary Examiner*—Robert H. Kim
*Assistant Examiner*—Thoi V. Duong
(74) *Attorney, Agent, or Firm*—Sughrue Mion, PLLC

(57) ABSTRACT

The present invention provides a method for producing a cholesteric liquid crystal color filter having excellent color pixel resolution. The method features forming a liquid crystal layer which includes a cholesteric liquid crystal composition containing at least a liquid crystal compound, a photoreactive chiral dopant, and a polymerization initiator; and forming partition walls at portions corresponding to a boundary of each of pixels to be formed, by irradiating those portions through a mask with ultraviolet light at a wavelength to which the polymerization initiator is sensitive, either before or after the pixels are formed in the liquid crystal layer.

11 Claims, 1 Drawing Sheet

UV IRRADIATION
(SHORT WAVELENGTH)

UV IRRADIATION
(LONG WAVELENGTH)

UV IRRADIATION
(SHORT WAVELENGTH)

METHOD FOR PRODUCING CHOLESTERIC LIQUID CRYSTAL COLOR FILTERS

BACKGROUND OF THE INVENTION

1. Field of the Invention

The present invention relates to a method for producing a cholesteric liquid crystal color filter and, more specifically, to a method for producing a cholesteric liquid crystal color filter having excellent color pixel resolution.

2. Description of the Related Art

A cholesteric liquid crystal color filter can be produced by various methods. For instance, there has been proposed a method of forming an alignment layer made of polyvinyl alcohol, polyimide, etc., on a substrate, and forming a liquid crystal layer of a first color region on the formed alignment layer using a liquid crystal composition containing a liquid crystal compound, a photoreactive chiral dopant, a polymerization initiator, etc. Then, ultraviolet radiation is applied under each of predetermined temperature conditions to form regions for each of colors, and ultraviolet radiation is applied through a mask to the entire surface under a predetermined temperature condition to polymerize and fix the aligned states to establish color patterning.

Another method features forming an alignment layer made of polyvinyl alcohol, polyimide, etc., on a substrate, and forming a liquid crystal layer of one color on the formed alignment layer using a liquid crystal composition containing a liquid crystal compound, a photoreactive chiral dopant, a polymerization initiator, etc. Then, after changing pitch of liquid crystals in accordance with a quantity of applied light, this aligned state is polymerized and fixed to establish color patterning. However, liquid crystal color filters implemented by these methods are insufficient and there is still room for improvement in color pixel resolution.

The present inventors have conducted intensive researches to improve color pixel resolution, and found that one of the reasons low color resolutions were produced was molecular diffusion of the photoreactive chiral dopant, which had been isomerized by patterning exposure, in the planar direction of the liquid crystal layer during the step of aligning the liquid crystals.

In order to cope with the aforementioned problems, there have been proposed methods to improve the color pixel resolution by reducing the diffusion of the isomerized chiral dopants, for instance, by means such as (1) lowering an aligning temperature (from higher temperatures in a range of from 100 to 130° C. to about 70° C.); (2) accelerating polymerization of the liquid crystal compound in the aligned state; (3) providing photoreactive chiral dopants with higher molecular weights; etc.

However, each of the above means is insufficient, in that the diffusion of the chiral dopants isomerized by UV irradiation can only be retarded, and cannot be completely prevented.

SUMMARY OF THE INVENTION

An object of the present invention is to provide a method for producing a cholesteric liquid crystal color filter capable of improving color pixel resolution by thoroughly preventing diffusion of chiral dopants isomerized by UV radiation from occurring.

The above object can be accomplished by the present invention as stated below.

Specifically, the present invention provides:

<1> A method for producing a cholesteric liquid crystal color filter, which includes steps of: (a) forming a liquid crystal layer including a cholesteric liquid crystal composition that contains at least a liquid crystal compound, a photoreactive chiral dopant, and a polymerization initiator; (b) forming pixels at the liquid crystal layer; and (c) either before or after the step of forming pixels, forming partition walls at portions corresponding to a boundary of each of the pixels, by irradiating the portions through a mask with ultraviolet light at a wavelength to which the polymerization initiator is photosensitive.

<2> A method for producing a cholesteric liquid crystal color filter, which includes steps of: (a) forming a liquid crystal layer including a cholesteric liquid crystal composition that contains at least a liquid crystal compound, a photoreactive chiral dopant, and a polymerization initiator; (b) while the liquid crystal layer is in an amorphous solid state or a microcrystalline state, forming partition walls at portions corresponding to a boundary of each of pixels to be formed, by irradiating the portions through a mask with ultraviolet light at a wavelength to which the polymerization initiator is photosensitive; and thereafter (c) forming the pixels.

<3> A method for producing a cholesteric liquid crystal color filter, which includes steps of: (a) forming a liquid crystal layer including a cholesteric liquid crystal composition that contains at least a liquid crystal compound, a photoreactive chiral dopant, and a polymerization initiator; (b) forming pixels while the liquid crystal layer is in an amorphous solid state or a microcrystalline state; and thereafter (c) forming partition walls at portions corresponding to a boundary of each of the pixels, by irradiating the portions through a mask with ultraviolet light at a wavelength to which the polymerization initiator is photosensitive.

DESCRIPTION OF THE PREFERRED EMBODIMENTS

Figure 1A:
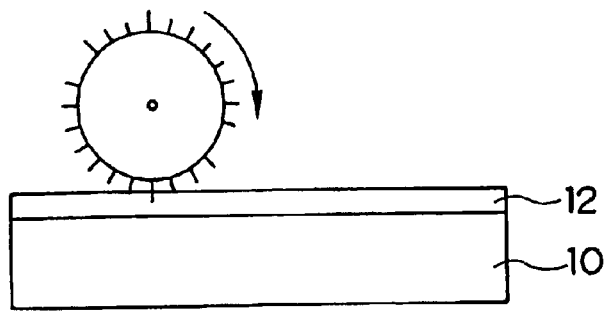
FIGS. 1A to 1E are schematic diagrams showing a preferred embodiment for producing a cholesteric liquid crystal color filter according to the present invention.

A preferred embodiment of the present invention is described below.

<Cholesteric Liquid Crystal Composition>

The cholesteric liquid crystal composition described above (hereinafter sometimes referred to simply as "liquid crystal composition") contains at least one type of nematic liquid crystal compound, at least one type of photoreactive chiral dopant (which forms a cholesteric liquid crystal phase), and at least one type of polymerization initiator; and, as necessary, may contain additional components such as a binder resin, a solvent, a surfactant, a polymerization inhibitor, a thickener, a coloring matter such as pigment, an ultraviolet absorber, a gelling agent, etc.

(Nematic Liquid Crystal Compound)

As the nematic liquid crystal compound, a compound suitably selected from a liquid crystal compound, a high molecular weight liquid crystal compound, and a polymerizable liquid crystal compound having a polymerizable group or a crosslinking group at an end of the liquid crystal molecule, which selected compound exhibits an anisotropy in refractive index $\Delta n$ in a range of 0.10 to 0.40, can be used. The nematic liquid crystal compound is aligned while it is in a melted liquid crystal state by, for instance, using an aligned substrate which has undergone an aligning treatment such as rubbing, and is then fixed by cooling and curing by polymerization, and thus can be used as a solid phase. That is, the liquid crystal compound can be formed into a tough film because it has an extremely high reactivity when efficiently polymerized in an aligned state.

As a preferred nematic liquid crystal compound, there can suitably be mentioned a liquid crystal compound having a UV-curable functional group (e.g., an acrylate group or the like), which is sensitive to ultraviolet light to cause polymerization and curing, introduced into the molecule of a cholesteric liquid crystal compound. A color filter having high film strength can be implemented by exposing such a liquid crystal compound to UV light for curing at a temperature as low as 120° C. or even lower.

The following compounds can be enumerated as specific examples of the nematic liquid crystal compound. However, it should be understood that the present invention is not limited thereto.

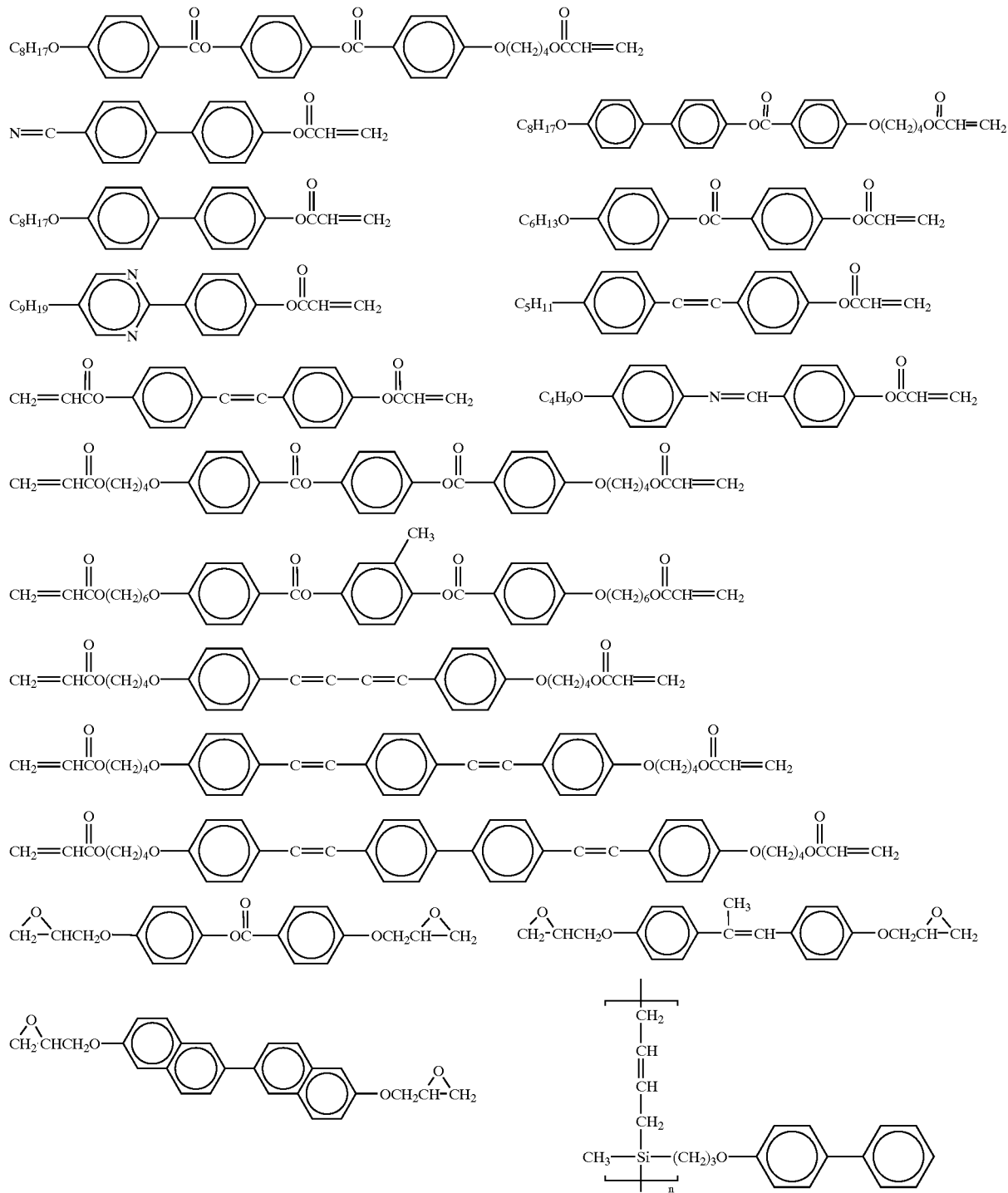

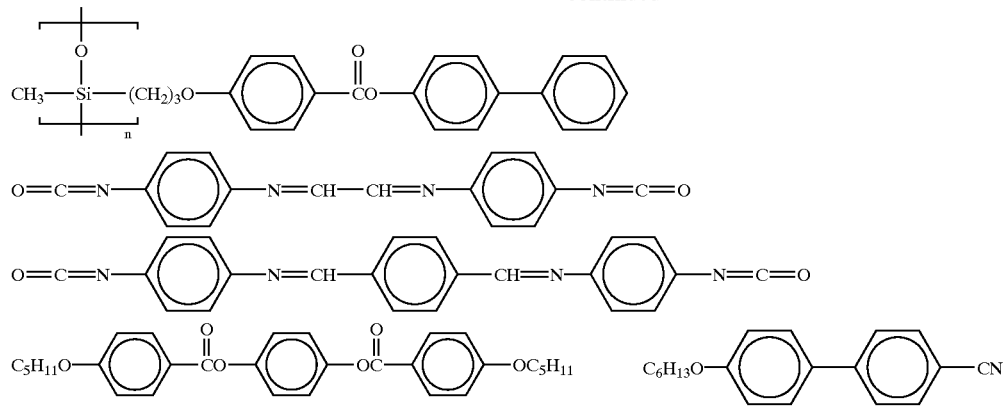

In the formulae listed above, n represents an integer from 1 to 1,000.

Also usable as preferred examples are compounds similar to the compounds exemplified above, in which side chain linking groups are replaced by groups having the following structures.

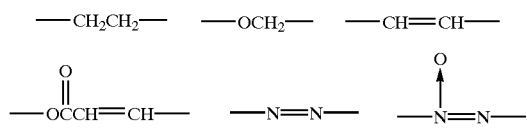

Among the nematic liquid crystal compounds described above, from the viewpoint of excellent curability and of ease in securing heat resistance of the layer, compounds that have a polymerizable group or a crosslinking group within the molecule are preferable.

It is preferable to incorporate the nematic liquid crystal compound in an amount preferably from 30 to 98% by mass, and more preferably from 50 to 95% by mass, relative to the mass of solids of the liquid crystal composition. If the amount is less than 30% by mass, alignment will be insufficient and hence desired selective color reflection cannot be achieved.

(Photoreactive Chiral Dopants)

The photoreactive chiral dopants mentioned above are compounds capable of altering a helical pitch that has been induced in the cholesteric liquid crystal composition when irradiated with light (in a range from ultraviolet through visible to infrared light). Accordingly, the photoreactive chiral dopants contain (as a molecular structural unit) a chiral site and a site that causes a structural change when irradiated with light. Preferably, such sites are contained within a single molecule.

In the present invention, a non-photoreactive chiral compound, whose helical twist is largely dependent on temperature, may be used in combination with the photoreactive chiral dopants described above.

In order to increase sensitivity to patterning, the chiral compound preferably has a peak photosensitivity in a longer wavelength region than a peak photosensitivity of a polymerization initiator.

Furthermore, a chiral compound that exhibits strong ability to induce helical structure in the cholesteric liquid crystal composition is preferred. Hence, the compound preferably has the chiral site positioned at the center of the molecule and surrounded by a rigid structure, and has a molecular weight of 300 or more. To increase the ability to induce helical structure when irradiated with light, preferably used is a chiral compound that undergoes a large extent of structural change when exposed to light, and the chiral site is preferably near the site which undergoes structural change when exposed to light.

Further preferred is a chiral compound having high solubility in the nematic liquid crystal compound. More preferred are those having a solubility parameter, an SP value, close to that of a liquid crystalline polymerizable monomer. Moreover, by using a chiral compound having a structure that has one or more polymerizable bonding groups, further improved heat resistance can be realized in the formed liquid crystal composition film (color filter).

As examples of structures of photoreactive portions that undergo structural change when irradiated with light, there can be mentioned photochromic compounds as described by Kingo Uchida and Masahiro Irie, "Chemical Industry (Kagaku Kogyo)", vol. 64, p. 640 (1999); and Kingo Uchida and Masahiro Irie, "Fine Chemicals", vol. 28(9), p. 15 (1999).

Specific examples are given below, but it should be understood that these examples are not limiting to the present invention.

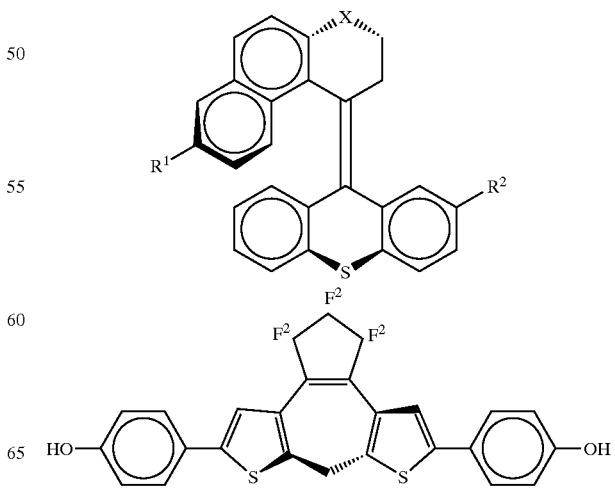

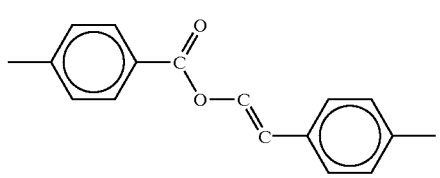

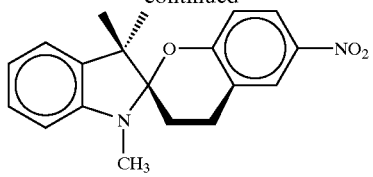

In the formulae above, $R^1$ and $R^2$ each represent an alkyl group, an alkoxy group, an alkenyl group, or an acryloyloxy group.

Also mentioned as chiral sites are those which undergo irreversible structural change when irradiated with light to cause reactions such as decomposition, addition, isomerization, dimerization, etc.

Further, possible chiral sites include asymmetric carbon atoms as in the compounds exemplified below, which are indicated with a * symbol and have different four groups bonded thereto (see Hiroyuki Nohira, "Chemistry of Liquid Crystals", Kagaku Sosetsu, No. 22, p. 73 (1994)).

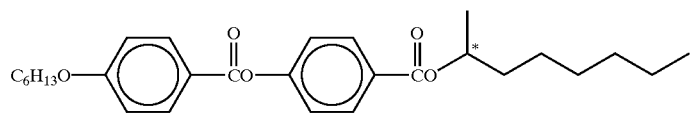

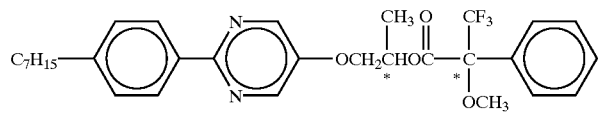

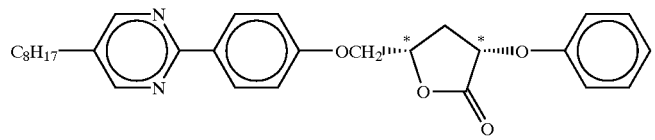

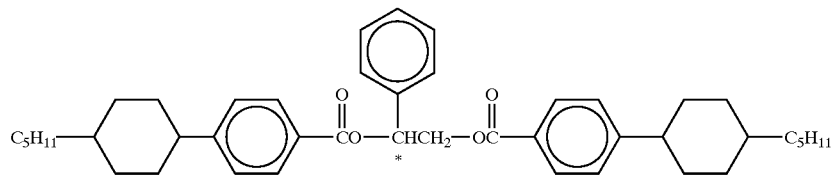

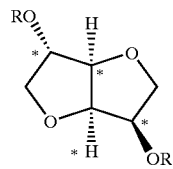

R =

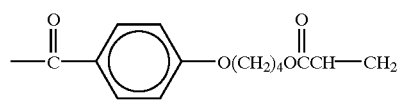

As an example of a photosensitive chiral dopant having both a chiral site and a photoisomerization site, there can be mentioned the following compound:

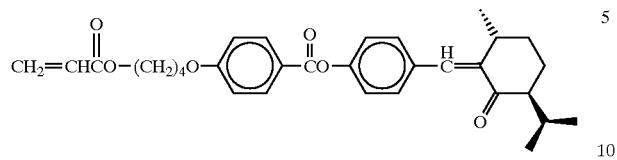

Further, photosensitive chiral compounds represented by the general formulae (I) and (II) shown below can also be mentioned as preferred examples.

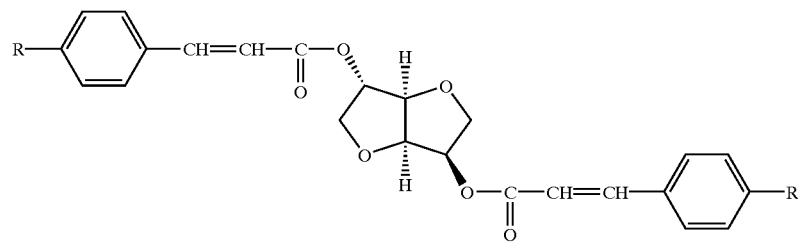

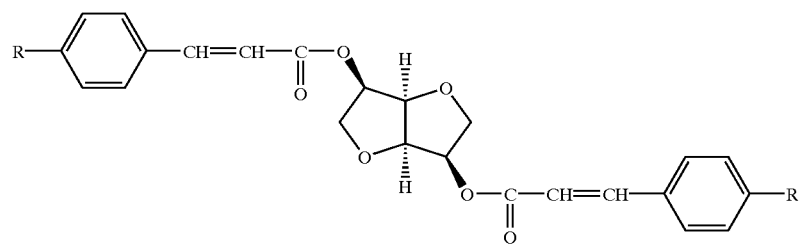

In the general formulae (I) and (II) shown above, R represents a hydrogen atom, an alkoxy group having 1 to 15 carbon atoms, an acryloyloxyalkyloxy group having a total of 3 to 15 carbon atoms, or a methacryloyloxyalkyloxy group having a total of 4 to 15 carbon atoms.

Specific examples of the compound represented by the general formula (I) are given below in order to exemplify the group R mentioned above (examples (1) to (15)), but these examples of R are not limiting to the present invention.

(1)
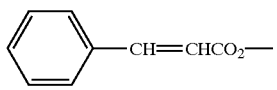

(2)
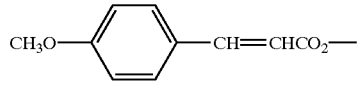

(3)
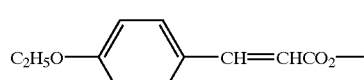

(4)
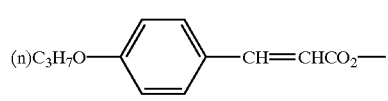

(5)
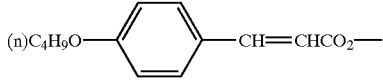

(6)
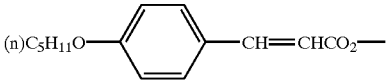

(7)
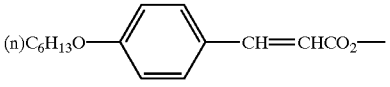

(8)
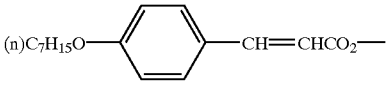

(9)
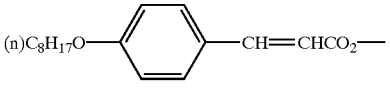

(10)
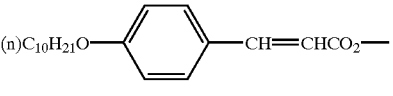

(11)
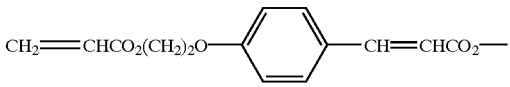

(12)
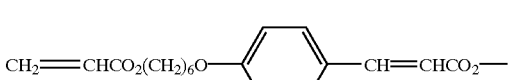

(13)
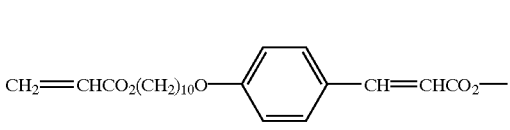

(14)

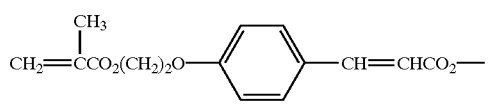

(15)

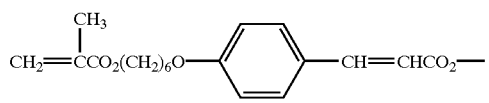

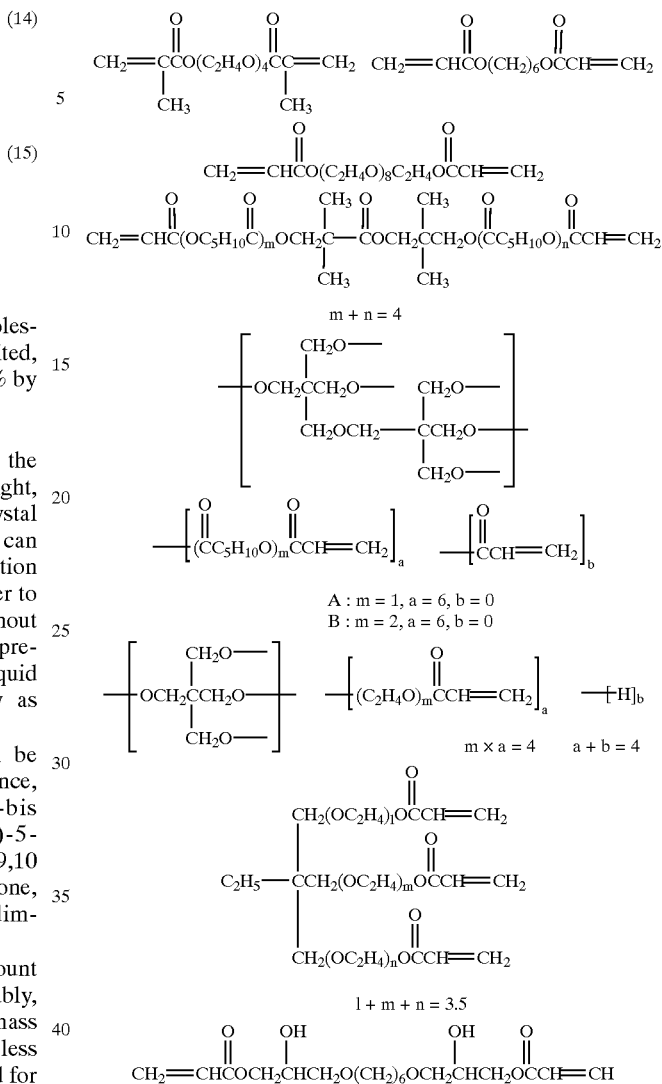

The total content of the chiral compounds in the cholesteric liquid crystal composition is not particularly limited, but the content is preferably in a range of from 2 to 30% by mass.

(Polymerization Initiator)

In cases of fixing the helical structure after changing the twisting force of the liquid crystal when irradiated with light, and further increasing the strength of the liquid crystal composition after fixing, a photopolymerization initiator can be added with a view to accelerating a polymerization reaction of unsaturated bonds. More specifically, in order to obtain selectively reflected light of high color purity without changing the obtained desired helical structure, it is preferred to accelerate the polymerization reaction of the liquid crystal composition such that it is cured as swiftly as possible.

Examples of the photopolymerization initiator can be suitably selected from those known in the art. For instance, there can be mentioned p-methoxyphenyl-2,4-bis(trichloromethyl)-s-triazine, 2-(p-butoxystyryl)-5-trichloromethyl- 1,3,4-oxadiazole, 9-phenylacridine, 9,10-dimethylbenzophenazine, benzophenone/Michler's ketone, hexarylbiimidazole/mercaptobenzimidazole, benzyldimethyl ketal, thioxanthone/amine, etc.

The photopolymerization initiator is added in an amount preferably from 0.1 to 20% by mass, and more preferably, from 0.5 to 5% by mass, relative to total solid content mass of the liquid crystal composition. If the amount added is less than 0.1% by mass, a long time duration will be required for polymerization due to low curing efficiency during irradiation with light. On the other hand, if the amount exceeds 20% by mass, light transmittance in the region from ultraviolet to visible may be poor.

(Polymerizable Monomer)

A polymerizable monomer may be added to the cholesteric liquid crystal composition. Conjoint use of the polymerizable monomer can, by changing twisting force of the liquid crystal when irradiated with light and thereafter fixing the helical structure (selective reflectivity), further increase the strength of the fixed liquid crystal composition that will be obtained by forming (patterning) a distribution of selective reflection wavelengths. However, in cases where the cholesteric liquid crystal compound contains an unsaturated bond within the molecule, addition of the polymerizable monomer is not always necessary.

As the polymerizable monomer, examples include, for instance, a monomer having an ethylenically unsaturated bond, etc. More specifically, multifunctional monomers such as pentaerythritol tetraacrylate, dipentaerythritol hexaacrylate and the like are mentioned.

As specific monomers having ethylenically unsaturated bonds, the compounds shown below can be mentioned. However, it should be understood that these examples are not limiting to the present invention.

The amount of the polymerizable monomer to be added is preferably in a range of 0.5 to 50% by mass. If the amount is less than 0.5% by mass, sufficient curability may not be achieved, and if the amount exceeds 50% by mass, sufficient color development may not be obtained since alignment of the liquid crystal molecules will be inhibited.

(Additional Components)

As additional components, there can be added a binder resin, a solvent, a surfactant, a polymerization inhibitor, a thickener, a colorant, a pigment, an ultraviolet absorbing agent, a gelling agent, etc.

The additional components as enumerated above influence the strength of the color filter film which has been hardened by ultraviolet curing. Hence, preferred are components having superior compatibility with the cholesteric liquid crystal compound.

Further, if the components above can migrate inside the hardened color filter film, free components will lower the film strength and change the properties of the color filter. Thus, it is preferred that the additional components to be added have functional groups similar to the polymerizable groups which have been introduced to the cholesteric liquid crystal compound, because such additional compounds can then be fixed inside the liquid crystal compound by polymerization curing without producing free components, and thus the film strength and other properties will not be impaired.

As binder resins, there can be mentioned, for instance, a polystyrene compound such as polystyrene, poly-α-methylstyrene, etc.; a cellulose resin such as methyl cellulose, ethyl cellulose, acetyl cellulose, etc.; an acidic cellulose derivative having a carboxyl group at a side chain; an acetal resin such as polyvinyl formal, polyvinyl butyral, etc.; a methacrylic acid copolymer, an acrylic acid copolymer, an itaconic acid copolymer, a crotonic acid copolymer, a maleic acid copolymer, a partially esterified maleic acid copolymer, etc., such as those described in Japanese Patent Application Laid-Open (JP-A) No. 59-44615, Japanese Patent Application Publication (JP-B) No. 54-34327, JP-B 58-12577, JP-B 54-25957, JP-A 59-53836, and JP-A 59-71048.

Also mentioned are homopolymers of alkyl acrylates and homopolymers of alkyl methacrylates, in which an alkyl group is, for instance, a methyl group, an ethyl group, an n-propyl group, an n-butyl group, an iso-butyl group, an n-hexyl group, a cyclohexyl group, a 2-ethylhexyl group, etc.

Further included as examples are compounds having an acid anhydride added to a polymer having a hydroxyl group, such as benzyl (meth)acrylate/(homopolymers of methacrylic acid)/acrylic acid copolymer, or a benzyl (meth)acrylate/(meth) acrylic acid/other monomer multicopolymer.

From the viewpoints of achieving excellent alkali development properties after patterning and of mass production, preferred as binder resins are those having a carboxyl group. If a binder resin having a carboxyl group is used as the binder resin in the cholesteric liquid crystal composition to prepare a coating solution for forming the liquid crystal layer on the substrate (by means of coating, transferring, etc.), alkali development becomes feasible, allowing easy patterning by performance of alkali development after the light irradiation.

The amount of the binder resin to be incorporated in the liquid crystal composition is preferably in a range from 0 to 50% by mass, and more preferably from 0 to 30% by mass. If the amount exceeds 50% by mass, alignment of the cholesteric liquid crystal compound may be insufficient.

Furthermore, the following components may be added to the composition of the present invention.

In the present invention, particularly preferred is conjoint use of a surfactant. For example, in cases of forming the liquid crystal layer by coating the cholesteric liquid crystal composition as a coating solution, the orientation of liquid crystal molecules at a layer surface that interfaces with air can be three-dimensionally controlled by using a surfactant. In the case of the cholesteric liquid crystal phase, in particular, selective reflection of light with certain wavelengths can be achieved, to produce higher color purity.

From the viewpoint of further improving color purity of selective reflection color hues in the liquid crystal composition of the present invention, it is preferred to use a surfactant together with the photoreactive chiral dopant and the nematic liquid crystal compound. More specifically, nonionic surfactants are preferable, and those suitably selected from known nonionic surfactants can be favorably used.

The amount of the surfactant to be incorporated in the liquid crystal layer is preferably in a range from 0.001 to 5% by mass, and more preferably from 0.05 to 1% by mass.

In order to facilitate the functions of the liquid crystal layer mentioned above, it is preferred to include the surfactants listed below in the liquid crystal composition.

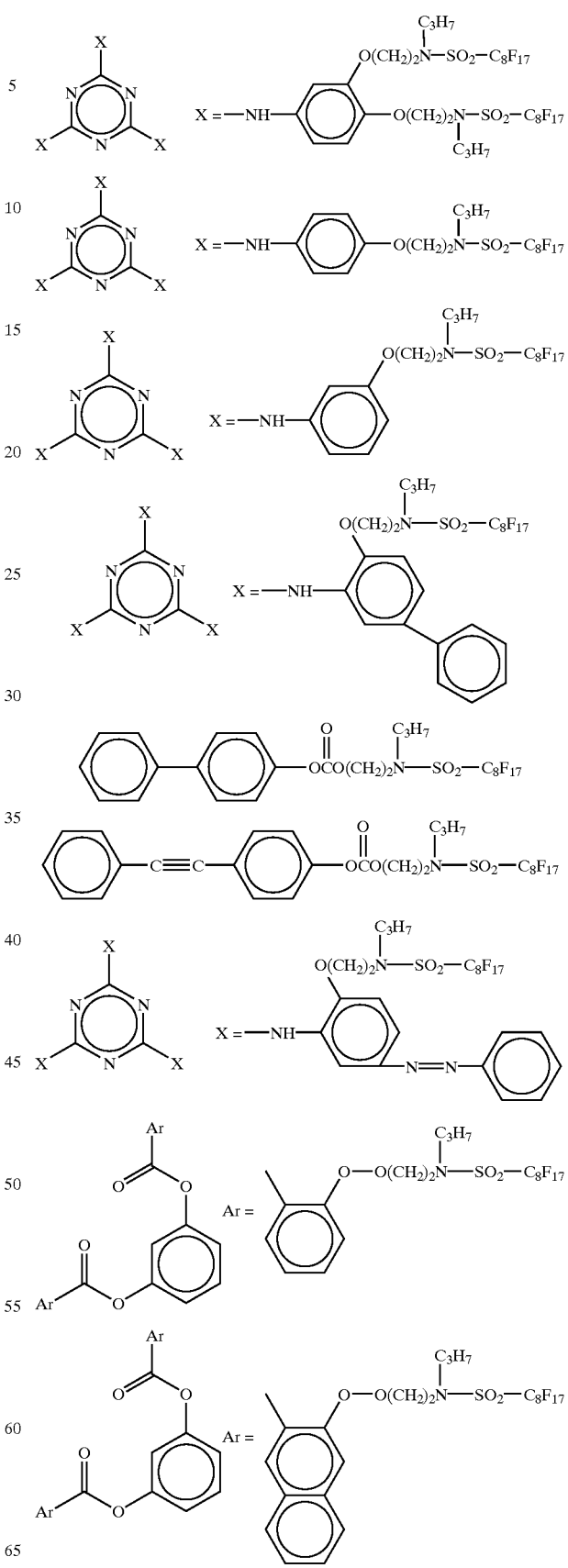

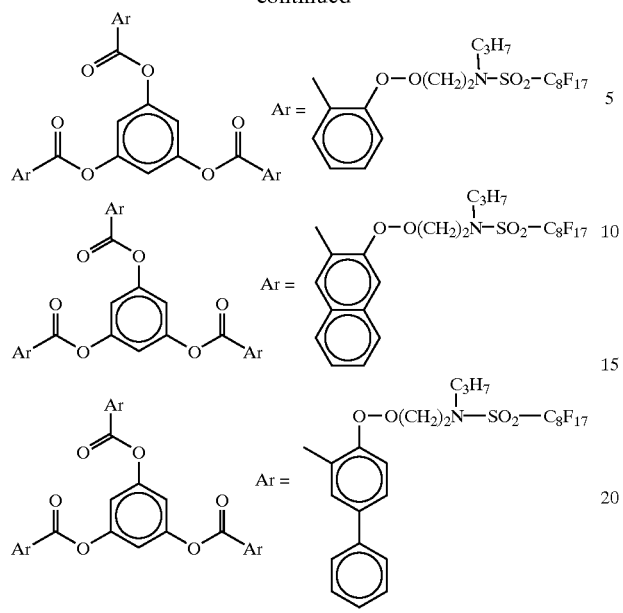

The polymerization inhibitor mentioned earlier is added with a view to improving preservation properties. Usable polymerization inhibitors are, for instance, hydroquinone, hydroquinone monomethyl ether, phenothiazine, benzoquinone, and the derivatives thereof. The amount of such polymerization inhibitors to be added is preferably in a range from 0 to 10% by mass, and more preferably from 0 to 5% by mass, relative to the mass of the polymerizable monomers described above.

An amount of additional components exclusive of the binder resin is preferably 10% by mass or less relative to total solid content of the cholesteric liquid crystal composition. If the amount of such other components exceeds 10% by mass, the strength of the hardened color filter film obtained by ultraviolet curing may be impaired.

The cholesteric liquid crystal layer (liquid crystal composition) can be prepared by dissolving and dispersing the aforementioned components in a suitable solvent, followed by forming the resulting dispersion into a desired shape or forming a certain shape on a support, and the like. As a solvent for use in this case, there can be mentioned, for instance, 2-butanone, cyclohexanone, methylene chloride, chloroform, etc.

<Method for Producing Cholesteric Liquid Crystal Color Filter>

A method for producing a cholesteric liquid crystal color filter according to the present invention is characterized by steps of: forming a liquid crystal layer containing the liquid crystal composition containing at least the liquid crystal compound, the photoreactive chiral dopant, and the polymerization initiator; and forming partition walls at the portions corresponding to the boundary of each of the pixels to be formed by irradiating those portions through a mask with ultraviolet light, either before or after forming each of the pixels in the liquid crystal layer, the ultraviolet light being at a wavelength to which the polymerization initiator is photosensitive.

A preferred embodiment for the method of producing a cholesteric liquid crystal color filter according to the present invention is described below with reference to the accompanying drawings.

Referring to FIGS. 1A to 1E, there is shown an LCD substrate 10, an alignment layer 12, a liquid crystal layer 14, a mask for forming partition walls (hereinafter, sometimes simply referred to as a "mask") 16, partition walls 18, and pixels (color patterning) 20.

Figure 1B:
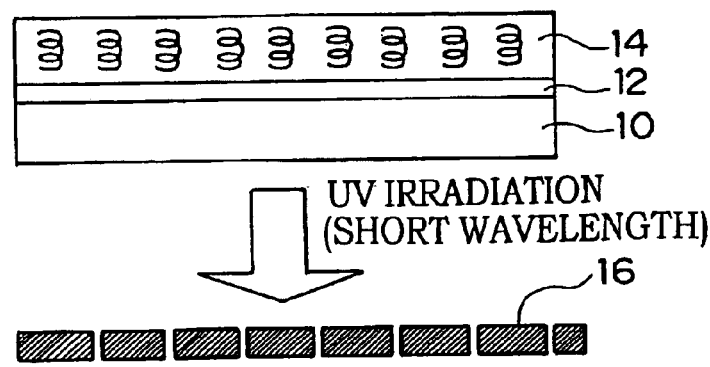

The production method has a step of forming the LCD substrate 10 having formed thereon the alignment layer 12 as shown in FIG. 1A, and a step of forming the liquid crystal layer 14 on the alignment layer 12 as shown in FIG. 1B. Subsequently, the method for producing a cholesteric liquid crystal color filter according to the present invention may be implemented by (1) an embodiment that includes forming each of the pixels after having formed partition walls beforehand at the portions corresponding to the boundary of each of the pixels in the liquid crystal layer, and (2) an embodiment that includes forming the partition walls after having formed each of the pixels in the liquid crystal layer.

In the case of the embodiment (1), it is preferred to form partition walls while the liquid crystal layer is still in an amorphous solid state or microcrystalline state, and then form each of the pixels. If the liquid crystal layer is kept in the amorphous solid state or microcrystalline state while forming the partition walls, adhesion of the liquid crystal substance to a patterning mask is preferably prevented from occurring. Furthermore, it is also preferred to form the partition walls while the liquid crystal layer is still in the amorphous solid state or in the microcrystalline state, and then form each of the pixels by allowing the liquid crystal layer to transform into a liquid crystalline phase. That is, since the partition walls have already been provided when the pixels are formed, if chiral compounds and the like that have high temperature dependence in forming a twist are used, a function of changing the helical pitch when the liquid crystal layer is allowed to transform into a liquid crystalline phase can be further improved. Furthermore, since diffusion of the chiral dopant can be prevented from occurring by the partition walls, a cholesteric liquid crystal color filter having excellent color pixel resolution can be realized.

In the case of the embodiment (2), it is preferred to form each of the pixels while the liquid crystal layer is still in the amorphous solid state or in the microcrystalline state, and then form the partition walls at the portions corresponding to the boundary of each of the pixels. By retaining the liquid crystal layer in the amorphous solid state or in the microcrystalline state while forming the pixels, diffusion of the photoreactive chiral dopant while forming the pixels can be suppressed, and, by forming the partition walls thereafter, diffusion of the photoreactive chiral dopant can be securely prevented from occurring.

The preferred embodiments according to the present invention are explained in further detail below based on the accompanying drawings. FIGS. 1A to 1E show the embodiment (2) described above.

In the following, common processing steps for embodiments (1) and (2) are described, and each of the embodiments (1) and (2) is shown thereafter.

<Formation of Liquid Crystal Layer>

The liquid crystal layer can be formed on the substrate by two methods: (i) a method of applying the liquid crystal composition in the form of a coating liquid onto a temporary support, followed by transference onto the substrate of a transfer material having at least the liquid crystal layer; and (ii) a method of directly applying the cholesteric liquid crystal composition onto the substrate.

(i) Process of Applying Liquid Crystal Composition in Coating Liquid Form onto Temporary Substrate, and Transferring Transfer Material Having at Least a Liquid Crystal Layer onto Substrate The liquid crystal composition in the form of a coating liquid can be prepared by dissolving and dispersing each of the components in an appropriate solvent. As the solvent, there can be mentioned, for instance, 2-butanone, cyclohexanone, methylene chloride, chloroform, etc.

In cases where foreign matter may be present on the transferred object or the like, a cushioning layer containing a thermoplastic resin and the like may be provided between the liquid crystal layer and the temporary support, from the viewpoint of securing tight adhesion when transferring. An aligning treatment (aligning step) such as a rubbing process, etc., is preferably conducted on the surface of the cushioning layer and the like.

The transfer material is then laminated on the substrate. Besides this substrate, an image receiving material comprising an image-receiving layer on a substrate may be used. Although it is possible to directly form the liquid crystal composition by coating, the transferring method is preferred from the viewpoints of material loss and cost. Next, the temporary support is peeled off from the substrate to form the cholesteric liquid crystal layer on the substrate. The liquid crystal layer may further have additional layers laminated thereon to form a multiple layer.

(ii) Process of Directly Applying Cholesteric Liquid Crystal Composition to Substrate The liquid crystal layer herein can be formed by applying a liquid crystal composition prepared to have the form of a coating liquid in a manner similar to that described above by employing a known coating method using a bar coater, a spin coater or the like (a coating step).

Furthermore, an alignment layer may be similarly formed between the cholesteric liquid crystal layer and the temporary support. It is also preferred to conduct an aligning treatment (aligning step), such as a rubbing process or the like, on the surface of the alignment layer.

Processing Step for Forming Partition Walls

Figure 1C:
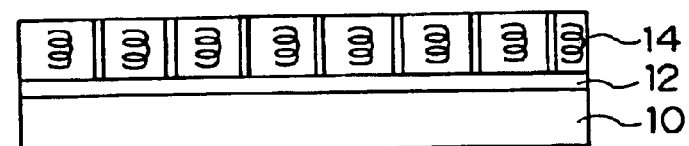
Figure 1D:
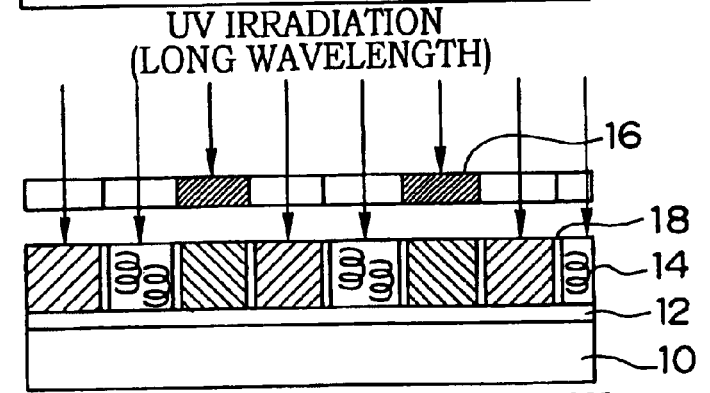
Figure 1E:
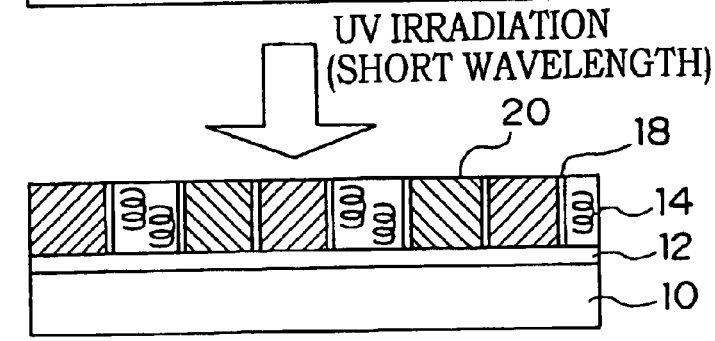

Whether this step is employed in embodiment (1) or (2), the step of forming the partition walls includes performing mask exposure by irradiating with ultraviolet light at a wavelength to which the polymerization initiator is photosensitive, using the mask 16 for forming partition walls as shown in FIG. 1C, which has opened areas provided only at regions corresponding to planar shapes to be surrounded by the partition walls. Concerning the relation between the spectral sensitivity of the photoreactive chiral dopant and the spectral sensitivity of the polymerization initiator in general, a spectral sensitivity range of the polymerization initiator lies at shorter wavelengths than that of the photoreactive chiral dopant. Hence, by exposing the liquid crystal composition to ultraviolet light having a wavelength corresponding to the spectral sensitivity of the polymerization initiator through the mask, regions of the liquid crystal layer corresponding to the partition walls alone are polymerized and fixed to produce the partition walls 18 as shown in FIG. 1D.

The illuminance (illumination intensity) of the light for use in the step of forming the partition walls is not particularly limited, and can be suitably selected depending on the materials used, such that light having a wavelength to which the polymerization initiator is photosensitive can be sufficiently obtained. As the light source for use in the irradiation, from the viewpoint of having high energy and of causing rapid structural change and a swift polymerization reaction of the liquid crystal compound, preferably used are light sources which emit ultraviolet light, for instance, a high pressure mercury lamp, a metal halide lamp, an Hg—Xe lamp, etc. Preferably, the light source possesses a function to emit a varied amount of light.

In the embodiment (1), the partition walls are formed, as described in detail below, followed by forming of the pixels, while in the embodiment (2), the pixels are formed before formation of the partition walls, as described in detail hereinafter.

Processing Step of Forming Pixels

A pixel pattern (color patterning) which can achieve selective reflection of color is formed by irradiating image-wise ultraviolet light having illuminance $v^1$ through an exposing mask while heating the cholesteric liquid crystal layer to a temperature of ca. 100° C.

In this exposure step, both patterning and fixing (polymerization curing) of the liquid crystal compound can be performed by light irradiation. More specifically, the patterning step [see FIG. 1C] can be carried out by image-wise exposure to a first light having a wavelength to which the photoreactive chiral dopant is highly sensitive, and then the fixing step [see FIG. 1D] can be performed by irradiating with a second light having a wavelength to which the polymerization initiator is highly sensitive to cause photopolymerization for curing, so that the helical structure of the liquid crystal compound is fixed to selectively reflect the desired light, thus producing the cholesteric liquid crystal color filter.

When the liquid crystal composition is irradiated with the first light, the coexisting photoreactive chiral dopant responds to the first light and the helical structure of the liquid crystal compound changes depending on the illumination intensity of the first light. Such a change induced in the structure produces a different selective color of light reflected and thus forms an image-wise pattern. Hence, by changing the illumination intensity of the light exposed onto desired individual regions, a plurality of colors can be exhibited depending on the illumination intensities applied. For instance, by exposing through an exposing mask which is designed to have light transmittance varied image-wise (see FIG. 1D), colored regions each selectively reflecting different colors can be formed simultaneously by the first light irradiation. Then, the resulting product is cured (fixed) by irradiating the second light to finally obtain the liquid crystal color filter.

For the first light, the wavelength is preferably set at a wavelength in the vicinity of the wavelength region to which the photoreactive chiral dopant is photosensitive, particularly at the peak photosensitive wavelength thereof, so that a sufficiently high patterning sensitivity can be thereby obtained. For the second light, the wavelength is preferably set at a wavelength close to the wavelength region to which the polymerization initiator is photosensitive, particularly at the peak photosensitive wavelength thereof, so that a sufficiently high photopolymerizing sensitivity can be obtained.

There is no particular limitation to the illuminance (illumination intensity) of the first and the second lights, and the illuminances can be suitably selected depending on the species of materials used in order to achieve a photosensitivity high enough to perform patterning and photopolymerization for curing. As light sources for use in applying the first and the second radiations, from the viewpoint of having high energy and of causing a rapid structural change and a swift polymerization reaction of the liquid crystal compound, preferably used are light sources which emit ultraviolet wavelength light, for instance, a high pressure mercury lamp, a metal halide lamp, an Hg—Xe lamp, etc. Preferably, the light source possesses a function to emit a varied amount of light.

After the fixing step described above, any unneeded liquid crystal layer and the like are removed by performing alkali development processing.

In order to carry out color patterning after having formed the partition walls as described above, the photoreactive chiral dopant is photoisomerized on undergoing patterning by light exposure. Since the thus photoisomerized chiral dopant is confined within each individual color patterning partitioned by the walls, it will not diffuse in the aligning step. Hence, impairment of color pixel resolution due to diffusion of the photoisomerized chiral dopant can be prevented from occurring.

In the case of forming the partition walls after having carried out color patterning, the photoreactive chiral dopant is photoisomerized on undergoing patterning by means of light exposure. However, since the photoisomerized chiral dopant is prevented from diffusing thereafter by the partition walls being formed, impairment of color pixel resolution due to diffusion of the photoisomerized chiral dopant can be prevented from occurring.

EXAMPLES

The present invention is described in further detail by way of the Examples below, but it should be understood that the present invention is not limited thereto.

Example 1
(Production of a Photosensitive Transfer Material)

A coating liquid prepared by the following formulation as a coating solution for forming a thermoplastic resin layer was applied to the surface of a 75-μm thick polyethylene terephthalate base film provided as a temporary support by using a spin coater, and the coating was dried in an oven at 100° C. for 2 minutes to obtain a 15-μm thick thermoplastic resin layer.
(Formulation of the Coating Solution for Forming a Thermoplastic Resin Layer)

| | |
|---|---|
| Styrene/acrylic acid copolymer (having a copolymerization ratio of 60/40 and a weight average molecular weight of 8,000) | 15 parts by mass |
| 2,2-bis(4-(methacryloxypolyethoxy)phenyl propane) | 7 parts by mass |
| Fluorine based surfactant | 1.5 parts by mass |

-continued

| | |
|---|---|
| (F-176PF, manufactured by Dainippon Ink and Chemicals, Inc.) | |
| Propylene glycol monomethyl ether | 28 parts by mass |
| Methyl ethyl ketone | 27 parts by mass |

Then, a coating solution prepared by the following formulation was applied on the produced thermoplastic resin layer by using a spin coater to form an intermediate layer, and the coating was dried in an oven at 100° C. for 2 minutes to obtain a 1.6-μm thick intermediate layer on the thermoplastic resin layer. Furthermore, the surface of the thus obtained intermediate layer was subjected to a rubbing treatment by using a nylon cloth.
(Formulation of the Coating Solution for an Intermediate Layer)

| | |
|---|---|
| Polyvinyl alcohol (PVA205, manufactured by Kuraray Co., Ltd.) | 15 parts by mass |
| Polyvinyl pyrrolidone (PVP-K30, manufactured by Gokyo Sangyo, Co., Ltd.) | 6 parts by mass |
| Methanol | 173 parts by mass |
| Ion-exchanged water | 211 parts by mass |

Each of the coating solutions described below for forming the photosensitive liquid crystal layer prepared by the following formulation was applied by using a spin coater, and the coating was dried in an oven at 100° C. for 2 minutes to obtain a photosensitive liquid crystal layer. A 12 μm-thick polypropylene film as a cover film was laminated on the produced photosensitive liquid crystal layer, to thus obtain a photosensitive transfer sheet consisting of a base film having provided thereon, in this order, a thermoplastic resin layer, an intermediate layer, and a photosensitive liquid crystal layer.
(Formulation of the Coating Solution for Forming a Photosensitive Resin) Layer

42 parts by mass

42 parts by mass

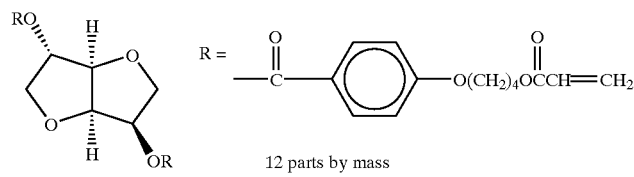

12 parts by mass

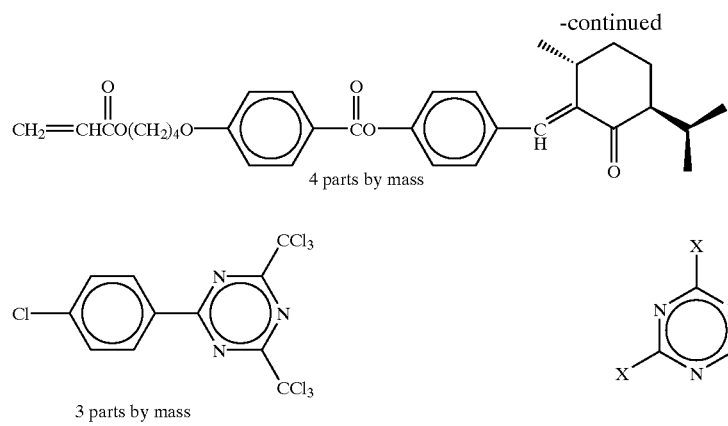

4 parts by mass 3 parts by mass

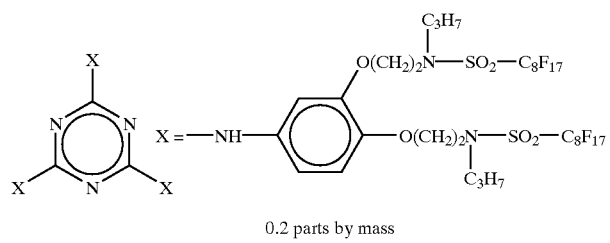

0.2 parts by mass (Production of a Color Filter)

method for producing a color filter is described below.

(1) Preparation of a Filter Substrate

A polyimide coating solution for an alignment layer was applied on a glass substrate by using a spin coater and, after drying the coating in an oven at 100° C. for 5 minutes, baking was performed in an oven at 250° C. for 1 hour to provide the alignment layer. Subsequently, the surface of the produced alignment layer was subjected to an aligning treatment by rubbing, to obtain a glass substrate having provided thereon an alignment layer.

(2) Formation of a Filter Layer

After removing a cover film from the photosensitive transfer sheet, the glass substrate having provided thereon an alignment layer was superposed on the photosensitive transfer sheet in such a manner that the surface of the alignment layer was brought into contact with the photosensitive liquid crystal layer, and the layers were adhered by using a laminator ("Fast Laminator 8B-550-80", manufactured by Taisei Laminator Co., Ltd.) at a pressure of 2 kg/m², a roller temperature of 130° C., and a feed rate of 0.2 m/min. The polyethylene terephthalate temporary support was peeled off and removed from the interface with the thermoplastic resin layer to remove the temporary support.

(3) Formation of Partition Walls

To the thus obtained glass substrate, ultraviolet irradiation was performed at portions corresponding to the boundary of each of pixels with a width of 10 μm while maintaining the produced glass substrate at room temperature, i.e., while maintaining the photosensitive liquid crystal layer in an amorphous solid state or microcrystalline state. The ultraviolet light was applied by using a super high pressure mercury lamp. The irradiation energy thus applied was 100 mJ/cm². Furthermore, to avoid exposure of the photosensitive liquid crystal layer corresponding to the pixel portions due to stray light of the irradiating ultraviolet radiation, it is preferred to perform exposure by using light having a wavelength distant from a peak sensitivity wavelength of the photoreactive chiral dopant, but having a wavelength close to a peak sensitivity wavelength of the polymerization initiator. In this context, in the case of the photosensitive liquid crystal layer according to the present Example, the exposure was preferably performed through an interference filter capable of transmitting light having a central wavelength at 310 nm.

(4) Formation of a Color Filter Latent Image

Subsequently, the glass substrate was subjected to exposure using a super high pressure mercury lamp at room temperature, through a photomask which allowed three kinds of transmittances (0%, 20%, and 92%), each arranged to correspond to red color pixels, green color pixels, and blue color pixels, and by using an interference filter capable of transmitting light having a central wavelength at 365 nm. An irradiation energy for the blue color pixels was 300 mJ/cm².

(5) Color Development

After removing the photomask, the photosensitive resin layer was caused to develop color by maintaining it on a hot plate at a temperature of 120° C. for 3 minutes.

(6) Fixation

Then, the resulting product was maintained on a hot plate at a temperature of 100° C. for 1 minute, and polymerization curing was effected by performing exposure (at an irradiation energy of 300 mJ/cm²) on the entire surface using the same super high pressure mercury lamp via an interference filter capable of transmitting light having a central wavelength at 310 nm. Subsequently, the thermoplastic resin layer and the intermediate layer were both removed by using a predetermined treating solution ("T-PD2", manufactured by Fuji Photo Film Co., Ltd.).

Furthermore, to accelerate hardening of the filter portion, baking was performed in an oven heated at 200° C. for 10 minutes, to obtain a color filter substrate having provided thereon red color pixel, green color pixel, and blue color pixel patterns.

Upon observing the filter under an optical microscope, it was confirmed that no coloring occurred at wall portions, and that no interpixel color mixing occurred.

Example 2

Procedures the same as those described for Example 1 were performed up to and including "(2) Formation of a filter layer".

(3) Formation of a Color Filter Latent Image

An obtained glass substrate was subjected to exposure using a super high pressure mercury lamp at room temperature (i.e., while maintaining the photosensitive liquid crystal layer in the amorphous solid state or microcrystalline state) through a photomask having three transmittances (0%, 20%, and 92%) arranged to correspond to red color pixels, green color pixels and blue color pixels respectively, and by using an interference filter capable of transmitting light having a central wavelength at 365 nm. The irradiation energy for the blue color pixels was 300 mJ/cm².

(4) Formation of Partition Walls

To the glass substrate thus obtained, ultraviolet irradiation was performed at portions corresponding to the boundary of each of pixels with a width of 10 μm while maintaining the produced glass substrate at room temperature. The ultraviolet light was applied by using a super high pressure mercury lamp through an interference filter capable of transmitting light having a central wavelength at 310 nm. The irradiation energy thus applied was 100 mJ/cm$^2$.

(5) Color Development

After removing the photomask, the photosensitive resin layer was caused to develop color by maintaining it on a hot plate at a temperature of 120° C. for 3 minutes.

(6) Fixation

Then, the resulting product was maintained on a hot plate at a temperature of 100° C. for 1 minute, and polymerization curing was effected by performing exposure (at an irradiation energy of 300 mJ/cm$^2$) on the entire surface by using the same super high pressure mercury lamp via an interference filter capable of transmitting light having a central wavelength at 310 nm. Subsequently, the thermoplastic resin layer and the intermediate layer were both removed by using a predetermined treating solution ("T-PD2", manufactured by Fuji Photo Film Co., Ltd.).

Furthermore, to accelerate hardening of the filter portion, baking was performed in an oven at 200° C. for 10 minutes to give a color filter substrate having provided thereon red color pixel, green color pixel, and blue color pixel patterns.

Upon observing the filter under an optical microscope, it was confirmed that no coloring occurred on the wall portions, and that no interpixel color mixing occurred.

Example 3

Procedures the same as those described for Example 1 were performed up to and including "(3) Formation of partition walls".

(4) Color Development and Patterning

An obtained glass substrate was maintained on a hot plate at a temperature of 120° C. for 3 minutes, and a photosensitive resin layer was allowed to transform into a liquid crystalline phase. Then, exposure was performed by using a super high pressure mercury lamp through a photomask having three transmittances (0%, 20%, and 92%) arranged to correspond to red color pixels, green color pixels and blue color pixels respectively, and by using an interference filter capable of transmitting light having a central wavelength at 365 nm. The irradiation energy for the blue color pixels was 300 mJ/cm$^2$.

(5) Fixation

After removing the photomask and maintaining the resulting product on a hot plate at a temperature of 100° C. for 1 minute, polymerization curing was effected by performing exposure (at an irradiation energy of 300 mJ/cm$^2$) on the entire surface by using the same super high pressure mercury lamp via an interference filter capable of transmitting light having a central wavelength at 310 nm. Subsequently, the thermoplastic resin layer and the intermediate layer were both removed by using a predetermined treating solution ("T-PD2", manufactured by Fuji Photo Film Co., Ltd.).

Furthermore, to accelerate the hardening of the filter portion, baking was performed in an oven at 200° C. for 10 minutes to produce a color filter substrate having provided thereon red color pixel, green color pixel, and blue color pixel patterns.

Upon observing the filter under an optical microscope, it was confirmed that no coloring occurred on the wall portions, and that no interpixel color mixing occurred.

Examples 4 to 6 were carried out by forming the photosensitive liquid crystal layer directly on the substrate by means of spin coating.

Example 4

(1) Preparation of a Filter Substrate

A polyimide coating solution for an alignment layer was applied on a glass substrate by using a spin coater and, after drying the coating in an oven at 100° C. for 5 minutes, baking was performed in an oven at 250° C. for 1 hour to provide the alignment layer. Subsequently, the surface of the produced alignment layer was subjected to an aligning treatment by rubbing, to thus obtain a glass substrate having provided thereon an alignment layer.

(2) Formation of a Filter Layer

The coating solution for forming the photosensitive resin layer used in Example 1 was applied by using a spin coater, and the coating was dried for 2 minutes in an oven at 100° C.

(3) Formation of Partition Walls

To the produced glass substrate, ultraviolet irradiation was performed on portions corresponding to boundaries of each of pixels with a width of 10 μm while maintaining the produced glass substrate at room temperature (i.e., while maintaining the photosensitive liquid crystal layer in the amorphous solid state or microcrystalline state). The ultraviolet light was applied by using a super high pressure mercury lamp. The irradiation energy thus applied was 500 mJ/cm$^2$. By carrying out this operation in gaseous nitrogen, the partition walls can be formed with an irradiation energy of lower illumination intensity. Furthermore, to avoid exposure of the photosensitive liquid crystal layer corresponding to the pixel portions due to stray light in the irradiating ultraviolet radiation, it is preferred to perform the exposure using light having a wavelength distant from the peak sensitivity wavelength of the photoreactive chiral dopant, but having a wavelength close to the peak sensitivity wavelength of the polymerization initiator. In this context, in the case of the photosensitive liquid crystal layer according to the present example, the exposure is preferably performed through an interference filter capable of transmitting light having a central wavelength at 310 nm.

(4) Formation of a Color Filter Latent Image

Subsequently, the glass substrate was subjected to exposure using a super high pressure mercury lamp at room temperature, through a photomask having three transmittances (0%, 20%, and 92%) arranged to correspond to red color pixels, green color pixels and blue color pixels respectively, and by using an interference filter capable of transmitting light having a central wavelength at 365 nm. The irradiation energy for the blue color pixels was 300 mJ/cm$^2$.

(5) Color Development

After removing the photomask, the photosensitive resin layer was caused to develop color by maintaining it on a hot plate at a temperature of 120° C. for 3 minutes.

(6) Fixation

Then, the resulting product was maintained on a hot plate at a temperature of 100° C. for 1 minute, and polymerization curing was effected by performing exposure (at an irradiation energy of 500 mJ/cm$^2$) on the entire surface by using the same super high pressure mercury lamp via an interference filter capable of transmitting light having a central wavelength at 310 nm. By carrying out this operation in gaseous nitrogen, the polymerization curing could be accomplished with an irradiation energy of lower illumination intensity.

Furthermore, to accelerate the hardening of the filter portion, baking was performed in an oven heated at 200° C. for 10 minutes, to provide a color filter substrate having provided thereon red color pixel, green color pixel, and blue color pixel patterns.

Upon observing the filter under an optical microscope, it was confirmed that no coloring occurred on the wall portions, and that no interpixel color mixing occurred.

Example 5

Procedures the same as those described for Example 4 up to and including "(2) Formation of a filter layer" were performed.

(3) Formation of a Color Filter Latent Image

An obtained glass substrate was subjected to exposure using a super high pressure mercury lamp at room temperature (i.e., while maintaining the photosensitive liquid crystal layer in the amorphous solid state or microcrystalline state) through a photomask having three transmittances (0%, 20%, and 92%) arranged to correspond to red color pixels, green color pixels and blue color pixels respectively, and using an interference filter capable of transmitting light having a central wavelength at 365 nm. The irradiation energy for the blue color pixels was 300 mJ/cm$^2$.

(4) Formation of Partition Walls

To the glass substrate thus obtained, ultraviolet irradiation was performed on portions corresponding to boundaries of each of pixels with a width of 10 $\mu$m while maintaining the obtained glass substrate at room temperature. The ultraviolet light was applied by using a super high pressure mercury lamp through an interference filter capable of transmitting light having a central wavelength at 310 nm. The irradiation energy thus applied was 500 mJ/cm$^2$.

(5) Color Development

After removing the photomask, the photosensitive resin layer was caused to develop color by maintaining it on a hot plate at a temperature of 120° C. for 3 minutes.

(6) Fixation

Then, the resulting product was maintained on a hot plate at a temperature of 100° C. for 1 minute, and polymerization curing was effected by performing exposure (at an irradiation energy of 500 mJ/cm$^2$) on the entire surface using the same super high pressure mercury lamp via an interference filter capable of transmitting light having a central wavelength at 310 nm. By carrying out this operation in gaseous nitrogen, the polymerization curing could be accomplished at an irradiation energy of lower illumination intensity.

Furthermore, to accelerate hardening of the filter portion, baking was performed in an oven at 200° C. for 10 minutes, to produce a color filter substrate having provided thereon red color pixel, green color pixel, and blue color pixel patterns.

Upon observing the filter under an optical microscope, it was confirmed that no coloring occurred on the wall portions, and that no interpixel color mixing occurred.

Example 6

Procedures the same as those described for Example 4 were performed up to and including "(3) Formation of partition walls".

(4) Color Development and Patterning

An obtained glass substrate was maintained on a hot plate at a temperature of 120° C. for 3 minutes, and the photosensitive resin layer was allowed to transform into a liquid crystalline phase. Then, exposure was performed by using a super high pressure mercury lamp through a photomask having three transmittances (0%, 20%, and 92%) arranged to correspond to red color pixels, green color pixels and blue color pixels respectively, and by using an interference filter capable of transmitting light having a central wavelength at 365 nm. The irradiation energy for the blue color pixels was 300 mJ/cm$^2$.

(5) Fixation

After removing the photomask and maintaining the resulting product on a hot plate at a temperature of 100° C. for 1 minute, polymerization curing was effected by performing exposure (at an irradiation energy of 500 mJ/cm$^2$) on the entire surface by using the same super high pressure mercury lamp via an interference filter capable of transmitting light having a central wavelength at 310 nm. By performing this operation in gaseous nitrogen, the polymerization curing could be accomplished at an irradiation energy of lower illumination intensity.

Upon observing the filter under an optical microscope, it was confirmed that no coloring occurred on the wall portions, and that no interpixel color mixing occurred.

As described above, the present invention provides a cholesteric liquid crystal color filter having partition walls formed in the liquid crystal layer and thus exhibiting excellent color pixel resolution.

What is claimed is:

1. A method for producing a cholesteric liquid crystal color filter, the method comprising the steps of:
   (a) forming a liquid crystal layer comprising a cholesteric liquid crystal composition that contains at least a liquid crystal compound, a photoreactive chiral dopant, and a polymerization initiator;
   (b) while the liquid crystal layer is in an amorphous solid state or a microcrystalline state, forming partition walls at portions corresponding to a boundary of each of pixels to be formed, by irradiating the portions through a mask with ultraviolet light at a wavelength to which the polymerization initiator is photosensitive; and thereafter
   (c) forming the pixels.

2. The method for producing a cholesteric liquid crystal color filter according to claim 1, wherein a surfactant is incorporated in the liquid crystal layer in an amount of 0.001 to 5% by mass.

3. The method for producing a cholesteric liquid crystal color filter according to claim 2, wherein the surfactant is a nonionic surfactant.

4. The method for producing a cholesteric liquid crystal color filter according to claim 10, wherein the step (c) comprises the sub-steps of:

patterning by image-wise exposure using a first light, to which the photoreactive chiral dopant is highly photosensitive; and fixing a helical structure of the liquid crystal compound to selectively reflect a desired color of light by performing photopolymerization curing using a second light, to which the polymerization initiator is highly photosensitive.

5. The method for producing a cholesteric liquid crystal color filter according to claim 4, wherein the photoreactive chiral dopant has a peak photosensitive wavelength at a longer wavelength side relative to a peak photosensitivity wavelength of the polymerization initiator.

6. The method for producing a cholesteric liquid crystal color filter according to claim 1, wherein the step (c) comprises transforming the liquid crystal layer into a liquid crystalline phase.

7. A method for producing a cholesteric liquid crystal color filter, the method comprising the steps of:
   (a) forming a liquid crystal layer comprising a cholesteric liquid crystal composition that contains at least a liquid crystal compound, a photoreactive chiral dopant, and a polymerization initiator;

(b) forming pixels while the liquid crystal layer is in an amorphous solid state or a microcrystalline state; and thereafter (c) forming partition walls at portions corresponding to a boundary of each of the pixels, by irradiating the portions through a mask with ultraviolet light at a wavelength to which the polymerization initiator is photosensitive.

8. The method for producing a cholesteric liquid crystal color filter according to claim 7, wherein a surfactant is incorporated in the liquid crystal layer in an amount of 0.001 to 5% by mass.

9. The method for producing a cholesteric liquid crystal color filter according to claim 8, wherein the surfactant is a nonionic surfactant.

10. The method for producing a cholesteric liquid crystal color filter according to claim 7, wherein the step (b) comprises the sub-steps of:

patterning by image-wise exposure using a first light, to which the photoreactive chiral dopant is highly photosensitive; and fixing a helical structure of the liquid crystal compound to selectively reflect a desired color of light by performing photopolymerization curing using a second light, to which the polymerization initiator is highly photosensitive.

11. The method for producing a cholesteric liquid crystal color filter according to claim 10, wherein the photoreactive chiral dopant has a peak photosensitive wavelength at a longer wavelength side relative to a peak photosensitivity wavelength of the polymerization initiator.

* * * * *